United States Patent
Gordon et al.

(10) Patent No.: US 7,961,947 B2
(45) Date of Patent: Jun. 14, 2011

(54) FACS CLEANING IN MOTION CAPTURE

(75) Inventors: Demian Gordon, Culver City, CA (US); Parag Havaldar, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 11/829,711

(22) Filed: Jul. 27, 2007

(65) Prior Publication Data

US 2008/0025569 A1    Jan. 31, 2008

Related U.S. Application Data

(60) Provisional application No. 60/834,132, filed on Jul. 28, 2006.

(51) Int. Cl.
*G06K 9/00* (2006.01)

(52) U.S. Cl. ........ 382/181; 382/103; 382/115; 382/118; 382/209; 382/224; 345/418; 345/419; 345/420; 345/473; 345/474

(58) Field of Classification Search ............... 345/418, 345/419, 420, 473, 474; 382/103, 115, 118, 382/181, 209, 224, 225, 228
See application file for complete search history.

(56) References Cited

U.S. PATENT DOCUMENTS

| | | | |
|---|---|---|---|
| 6,020,892 A * | 2/2000 | Dillon | 345/473 |
| 6,072,496 A * | 6/2000 | Guenter et al. | 345/419 |
| 6,163,322 A * | 12/2000 | LaChapelle | 345/473 |
| 7,068,277 B2 | 6/2006 | Menache | |
| 7,127,081 B1 * | 10/2006 | Erdem | 382/103 |
| 7,239,321 B2 | 7/2007 | Berger | |
| 2004/0179013 A1 * | 9/2004 | Menache | 345/473 |
| 2006/0071934 A1 * | 4/2006 | Sagar et al. | 345/473 |
| 2006/0126928 A1 * | 6/2006 | Edwards et al. | 345/420 |

OTHER PUBLICATIONS

Sifakis et al., Automatic Determination of Facial Muscle Activations from Sparse Motion Capture Marker Data, ACM Transactions on Graphics, vol. 24, Issue 3, Jul. 2005, pp. 417-425.*
Turk et al., Eigenfaces for Recognition, Journal of Cognitive Neuroscience, vol. 3, No. 1, 1991, pp. 71-86.*
Office Action issued in U.S. Appl. No. 11/829,731 on Mar. 25, 2009.
Kouadio, et al., "Real-Time Facial Animation Based Upon a Bank of 3D Facial Expressions", published 1998.
Essa et al., "Facial Expression Recognition Using a Dynamic Model and Motion Energy", IEEE 1995.
Sang II Park et al., "Capturing and Animating Skin Deformation in Human Motion", School of Computer Science, Carnegie Mellon University, 2006.
International Search Report/Written Opinion issued in PCTUS07/74744 on Jun. 4, 2008.

* cited by examiner

*Primary Examiner* — Vikkram Bali
*Assistant Examiner* — Daniel Zeilberger
(74) *Attorney, Agent, or Firm* — Samuel S. Lee; Procopia, Cory, Hargreaves & Savitch LLP

(57) ABSTRACT

A method of cleaning facial marker data, the method comprising: decimating frames of survey facial marker data into representative frames of key facial poses; generating a facial pose matrix using the representative frames of key facial poses; and cleaning incoming frames of facial marker data using the facial pose matrix.

22 Claims, 9 Drawing Sheets

FACS CLEANING IN MOTION CAPTURE

CROSS-REFERENCE TO RELATED APPLICATIONS

This application claims the benefit of priority pursuant to 35 U.S.C. §119 of U.S. Provisional Patent Application No. 60/834,132, filed Jul. 28, 2006, entitled "FACS Cleaning in Motion Capture," the disclosure of which is hereby incorporated by reference.

This application further incorporates by reference the disclosures of commonly assigned U.S. Pat. No. 7,068,277, filed May 23, 2003, entitled "System and Method for Animating a Digital Facial Model," U.S. patent application Ser. No. 10/427,114, filed May 1, 2003, entitled "System and Method for Capturing Facial and Body Motion," and U.S. patent application Ser. No. 11/739,448, filed Apr. 24, 2007, entitled "Performance Driven Facial Animation."

BACKGROUND

The present invention relates generally to motion capture, and more particularly to methods and systems for cleaning and stabilizing facial motion marker data.

Motion capture systems are used to capture the movement of a real object and map it onto a computer-generated object as a way of animating it. These systems are often used in the production of motion pictures and video games for creating a digital representation of an object or person that is used as source data to create a computer graphics ("CG") animation. In a typical system, an actor wears a suit having markers attached at various locations (e.g., small reflective markers are attached to the body and limbs). Precisely-placed digital cameras then record the actor's body movements in a capture space from different angles while the markers are illuminated. The system later analyzes the images to determine the locations (e.g., spatial coordinates) and orientations of the markers on the actor's suit in each frame. By tracking the locations of the markers, the system creates a spatial representation of the markers over time and builds a digital representation of the actor in motion. The motion is then applied to a digital model in virtual space, which may then be textured and rendered to produce a complete CG representation of the actor and/or the performance. This technique has been used by special effects companies to produce realistic animations in many popular movies.

Capturing the motion manifesting an actor's facial expressions entails an approach similar to capturing body movements. However, it is not practical for the actor to wear a "suit" on his or her face. Moreover, human facial expressions involve facial muscle movements significantly more subtle than typical body motions. For facial motion capture, relatively small-sized markers are affixed directly to the actor's face, positioned to define facial movement, and applied in sufficient number to capture the many subtle types of facial muscle movements. However, a large number of markers and their proximities makes post-capture frame-to-frame marker tracking difficult, and requires significant manual processing to ensure that each individual marker is accurately tracked.

SUMMARY

Embodiments of the present invention include systems, methods, apparatus, and computer programs to implement techniques of cleaning facial marker data.

In one aspect, a method of cleaning facial marker data is disclosed. The method includes: decimating frames of survey facial marker data into representative frames of key facial poses; generating a facial pose matrix using the representative frames of key facial poses; and cleaning incoming frames of facial marker data using the facial pose matrix.

In another aspect, a facial marker data cleaning system is disclosed. The system includes: a frame decimator module to receive frames of survey facial marker data and to generate frames of representative key facial poses; a FACS module to receive the representative frames of key facial poses and to generate a facial pose matrix; and a cleaner module to receive incoming frames of facial marker data and to use the facial pose matrix to generate frames of cleaned facial marker data.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Certain implementations as disclosed herein provide techniques for cleaning frames of facial marker data. In one implementation, the cleaning involves decimating frames of survey facial marker data into representative frames of key facial poses; generating a facial pose matrix using the representative frames of key facial poses; and cleaning incoming frames of facial marker data using the facial pose matrix. In one example, cleaning includes removing a facial marker data point moving uniquely by itself. In another example, all facial marker data points in a given muscle group are constrained to move together.

After reading this description it will become apparent to one skilled in the art how to implement the invention in various alternative implementations and alternative applications. However, although various implementations of the present invention will be described herein, it is understood that these implementations are presented by way of example only, and not limitation. As such, this detailed description of various implementations should not be construed to limit the scope or breadth of the present invention as set forth in the appended claims.

Figure 8:
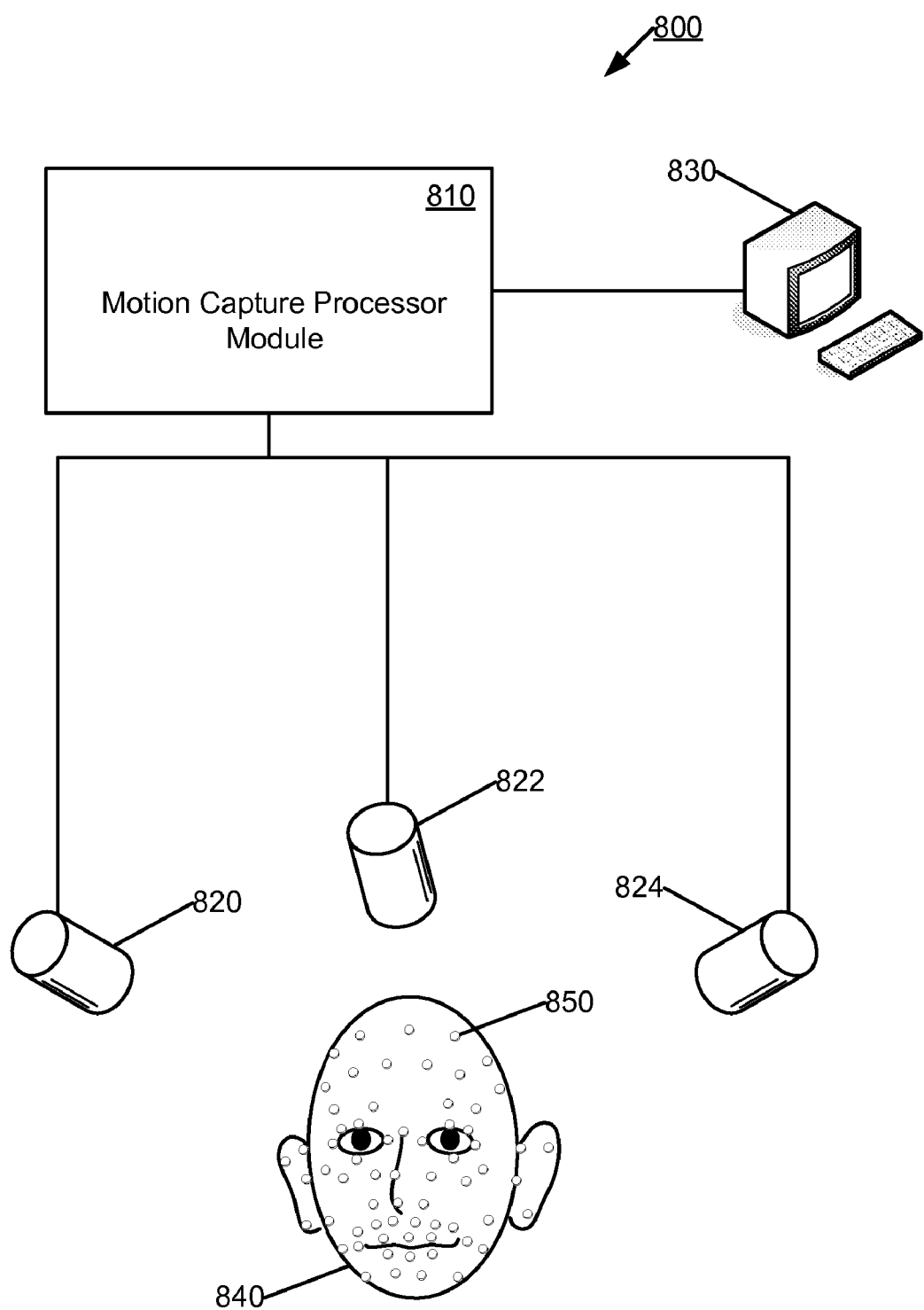
FIG. 8 is a functional block diagram of an example facial motion capture system.

FIG. 8 is a functional block diagram of a facial motion capture system 800 in accordance with one implementation. The facial motion capture system 800 includes a motion capture processor module 810, motion capture cameras 820, 822, 824, a user workstation 830, and an actor's face 840 applied with a plurality of facial markers 850. The motion capture processor module 810 can be connected to the workstation 830 by wire or wirelessly. The motion capture processor module 810 is typically configured to receive control data packets from the workstation 830.

In the illustrated implementation of FIG. 8, three motion capture cameras 820, 822, 824 are connected to the motion capture processor module 810. However, more than three motion capture cameras can be used according to a variety of user and animation-related requirements. The motion capture cameras 820, 822, 824 are focused on the actor's face 840, on which surface sensors (shown as spherical facial markers 850) have been placed at target points. The placement of the markers is usually configured to capture facial muscle groups, for example. Alternatively, the markers are configured for other predefined areas of interest on the actor's face 840.

The motion capture cameras 820, 822, 824 are controlled by the motion capture processor module 810 to capture frame by frame 2-D images of the markers. The image data comprising the 2-D images thus captured are typically stored and/or viewed in real-time at the user workstation 830.

The motion capture processor module 810 integrates (i.e., performs a "reconstruction" of) the image data to generate a frame sequence of 3-D (volumetric) facial marker data. In general, facial marker data comprise a plurality of individual facial marker data points, and each point represents a spatial position of a marker. Each frame includes a plurality of facial marker data points. The frame sequence is often referred to as a "beat," which can also be thought of as a "take". The motion capture processor module 810 retrieves the frame sequence and performs a tracking function to accurately map the facial marker data points of each frame with the facial marker data points of each preceding and following image frame in the sequence. For example, each individual facial marker data point in a first frame corresponds by definition to a single facial marker placed on the actor's face. A unique label is therefore assigned to each facial marker data point of a first frame. The facial marker data points are then associated with corresponding facial marker data points in a second frame, and the unique labels for each facial marker data points of the first frame are assigned to the corresponding points of the second frame. When the labeling process is completed for the frame sequence, the facial marker data points of the first frame are traceable through the sequence, resulting in an individual trajectory for each facial marker data point.

In one implementation, each labeled facial marker data point is represented as a vertex in space, each frame thus including a system of vertices, and the system of vertices comprising a modeled surface of the actor's face 840. Although it is intended for the facial marker data in each frame to be properly mapped to corresponding facial marker data in the other frames of the sequence, thus generating smooth and connected motions for the facial marker data points, tracking errors can occur. Errors commonly include improperly mapping a marker in one frame with a different marker in the next, causing a "jerk" in the motion of the trajectory. Errors also include "jiggle," where markers are continually mislabeled over a sequence of frames. Other examples of errors include bad triangulation, reconstruction of poorly seen views of objects, and mathematical "ghosts" that are correct in two axes but wrong in the third axis.

Errors are corrected, in one implementation, with the use of a facial action coding system. A facial action coding system ("FACS") provides a standard taxonomy for systematically categorizing human facial expressions. Facial movement data representative of various facial expressions are captured using a motion capture system such as that depicted in FIG. 8, and are categorized according to a FACS. Tracking errors causing anomalies in the trajectories of labeled marker data make these data unsuitable for categorization.

In one implementation, a FACS system is developed for an actor on the basis of a plurality of initial facial surveys. The actor is fitted with motion capture markers on the face and instructed to perform a range of predetermined expressions, or facial poses. These facial poses are motion-captured under ideal conditions in a small capture volume, where lighting is closely controlled and extraneous movements meticulously restricted. The actor is often seated or standing motionless to further isolate facial movements from other body movements. The facial marker data are reconstructed, a facial marker data tracking procedure is performed, and the resulting data are "cleaned." The facial marker data that were mislabeled during the tracking procedure are then correctly relabeled. Jiggle, for example, is eliminated by relabeling one or more marker data points so that their motions over a sequence of frames conform to a smooth trajectory.

In summary, the motion capture processor module 810 of the facial motion capture system 800 can perform following tasks: labels the beat; examines all labeled trajectories; removes noise; corrects mislabeled markers; removes ghost or poorly reconstructed data; fills gaps in the data; and applies a filter to further smooth out the trajectory.

Figure 1:
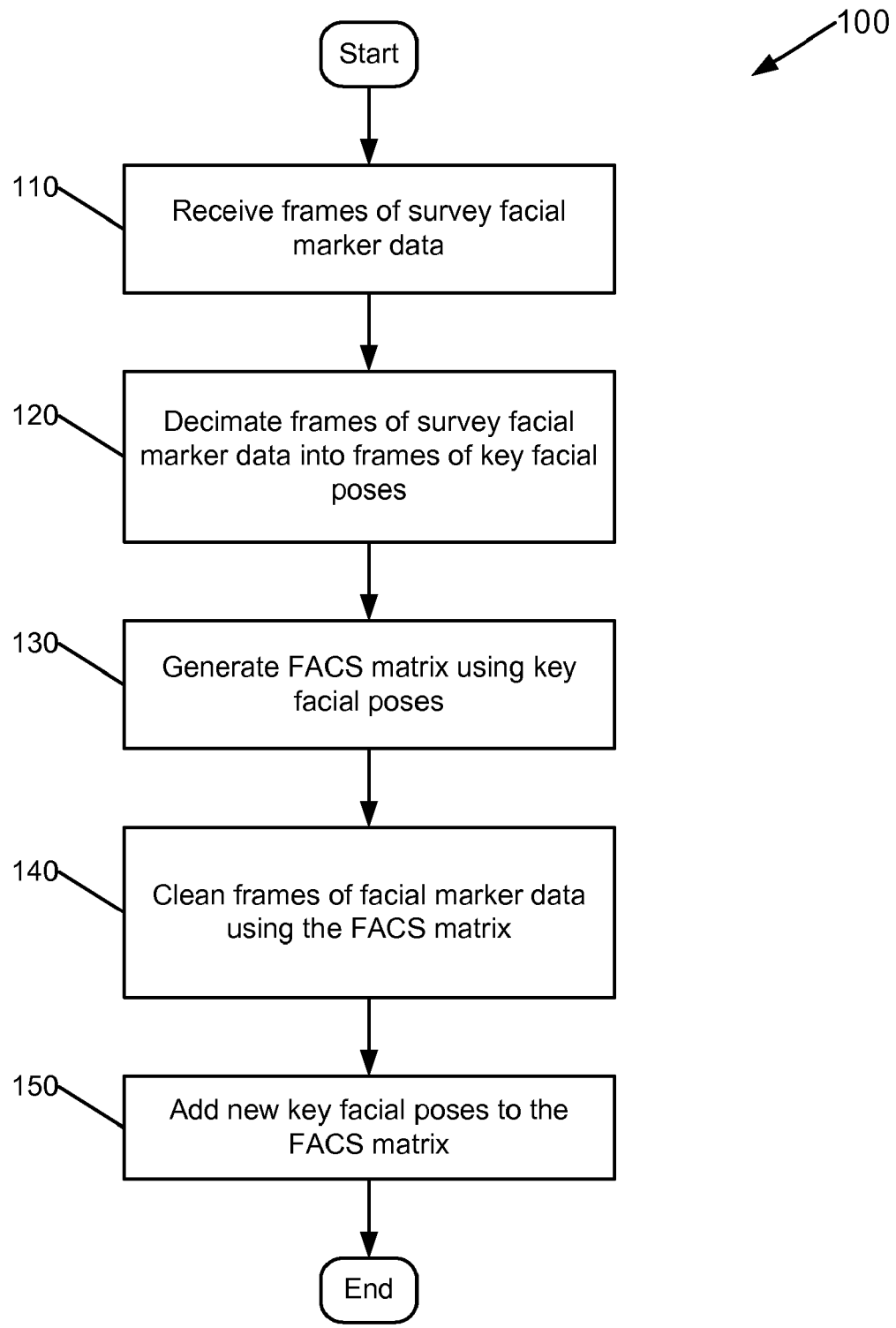
FIG. 1 is a flowchart of an example method of FACS cleaning.

A method of FACS cleaning 100 according to one implementation is illustrated by the flowchart of FIG. 1. Following a survey of facial expressions, as discussed above, frames of facial marker data are received, at block 110, and decimated into frames of key facial poses, at block 120. Key facial poses include, for example, various expressive components such as a lip raiser, eyebrow raiser, and cheek puffer.

A FACS matrix (or, more generally, a facial pose matrix) is generated, at block 130, to maintain some or all of the key facial poses extracted from the survey facial marker data (at block 120). The FACS matrix functions as a "constraint space," defining rules for determining when a motion computed for a facial marker data point is within acceptable limits (also referred to herein as an "allowable" motion). As an example of a tracking error, a facial marker data point p is labeled correctly in frames A and C, but another facial marker data point q in intervening frame B (frame B between frames A and C) is improperly labeled as p, leaving the correct point p in frame B unlabeled or mislabeled. When viewing the sequence of frames, the point p consequently exhibits discontinuity in its trajectory by appearing to jump to an unexpected position, i.e., to the position of q, when frame B is shown. Constraining the movement of p in frame B, for example, according to an interpolation of the motion of p between frames A and C eliminates the possibility that q should be labeled as p. Point q in frame B is then delabeled and p to be correctly labeled in frame B, because p in frame B would be the most likely point to satisfy the interpolation. Similarly, q is also relabeled correctly to conform to the correct trajectory of q through the frame sequence.

In one implementation, a rule for determining whether a motion of a facial marker data point is allowable requires that no facial marker data point move uniquely by itself. In another implementation, all facial marker data points in a given muscle group are required to move together in order for the motion of any of the data points to be allowable.

A FACS matrix is thus individually calibrated to an actor on the basis of a selection of specific example facial poses, providing accurate, precise, and robust means for classifying the actor's facial expressions captured subsequently in performances.

Facial motion capture data are cleaned using the FACS matrix, at block 140. Typically, a beat of facial motion capture data is received. Facial marker data points are analyzed, and movements which are not allowable according to predefined rules are identified. In one implementation, only allowable facial marker data point movements are returned. Thus, cleaning provides a filtering effect to remove noise artifacts in the facial marker data. Further, cleaning includes determining spatial positions which the marker data points should have occupied but were instead occluded during the actor's performance (e.g., where the view of a marker is blocked by a prop or another actor during a performance). The resulting gaps in the facial marker data point trajectories are filled in with data points conforming to applicable rules. Additional filter may be applied to further smooth out the trajectory. Gapless, properly labeled, and noiseless data points are thus generated.

Some facial poses received in data generated during an actor's performance do not readily "fit" to the facial poses already maintained by the FACS matrix. Once these facial marker data are cleaned, as discussed above, these marker data are added to the FACS matrix as new key facial poses, at block 150, to expand the range of facial poses maintained by the FACS matrix. Thus, facial poses received in subsequent performances are matched against a broader base of calibrated poses in the FACS matrix.

In one implementation, once such a new pose is added to the FACS matrix, the same beat from which the new pose was extracted is processed again using the enhanced FACS matrix, resulting in improved accuracy and consistency in the cleaned facial marker data generated. Adding new key facial poses to the FACS matrix is discussed in more detail below in relation to FIG. 3.

Figure 2:
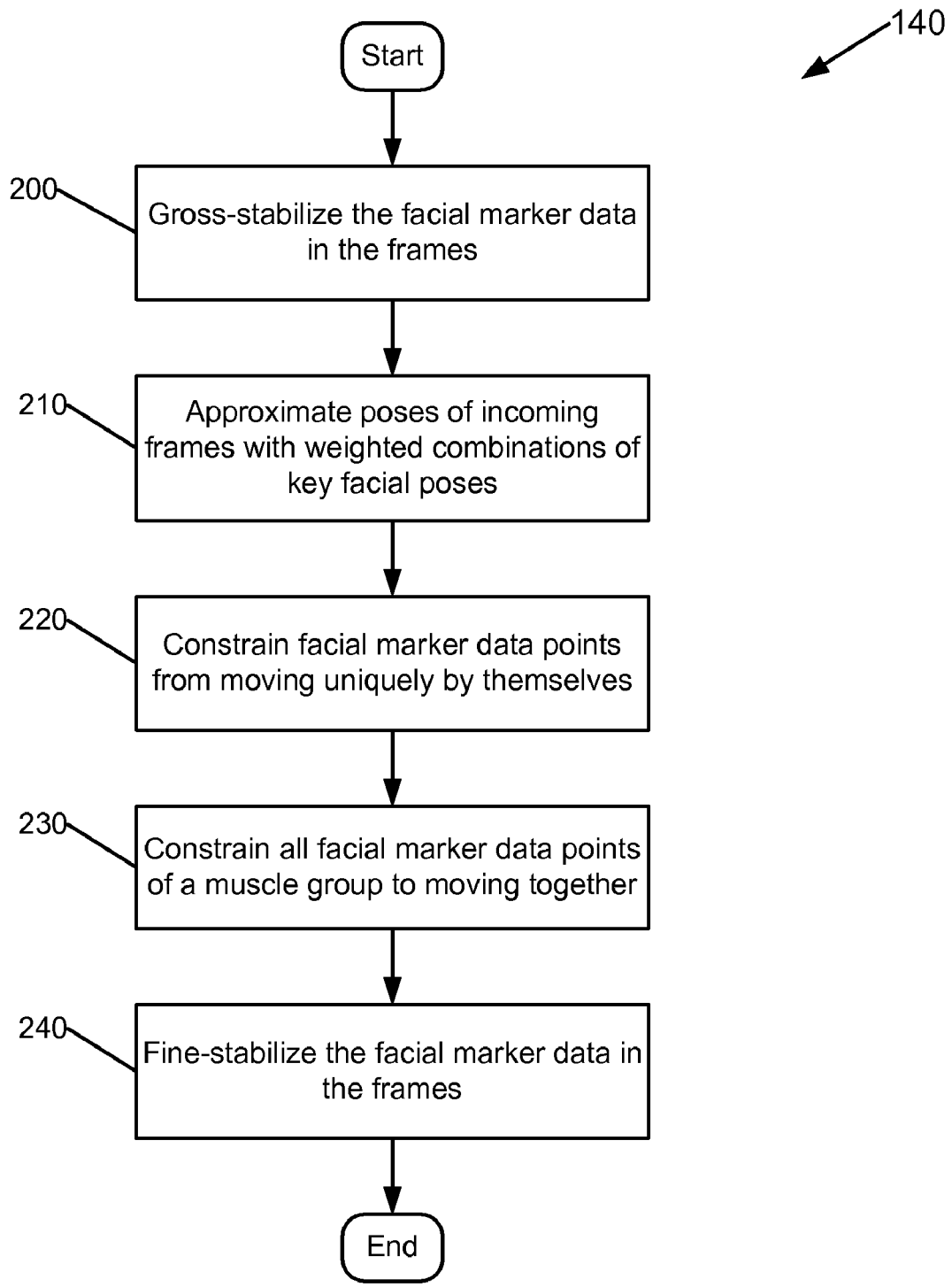
FIG. 2 is a flowchart of an example method of cleaning frames of facial marker data.

FIG. 2 is a flowchart illustrating an example method 140 of cleaning frames of facial marker data.

The facial marker data of a frame sequence are gross-stabilized, at block 200. During the course of a facial motion capture beat, an actor may execute large movements of the head, including translational and rotational movements, in addition to subtle motions related to facial expressions. In one implementation, the large movements of the head are eliminated, resulting in translation- and rotation-invariant facial marker data, and exposing the subtle movements of the actor's facial expressions. For example, a first frame of facial marker data is identified. Other frames of facial marker data in the frame sequence are aligned to the facial marker data of the first frame according to two or more predefined rigid points on the actor's face. Rigid points include facial marker data points corresponding to markers attached at the head, ears, and bridge of the nose, for example. Generally, rigid points are selected such that they are invariant with respect to the actor's facial expression, but yet correspond to the actor's physical movements in the motion capture performance space. A spatial coordinate system is defined with respect to the rigid points for the sequence of frames. Remaining movements of the facial marker data are therefore defined accordingly in that spatial coordinate system, and are related substantially only to facial expressions.

Weighted combinations of key facial poses approximating the poses represented by the facial marker data of incoming frames are determined, at block 210. In one implementation, frames of the actor's performance are analyzed in the space of all the FACS poses (i.e., action units) of the FACS matrix. Accordingly, the FACS poses may be viewed as facial basis vectors defined by spatial data points (i.e., facial marker data). A weight for each facial basis vector of the FACS matrix is computed for an incoming frame, such that the weighted combination of facial basis vectors (i.e., FACS poses) approximates the new pose in the incoming frame. In some cases, one or more of the weights are zero because not all of the FACS poses are related to the pose of the incoming facial marker data. The facial marker data of the new pose are then compared to the weighted combination of FACS poses to determine whether there are any missing, mislabeled, or "unallowably" noisy (i.e., "defective") facial marker data points. Defective facial marker data points are replaced in the incoming frame with appropriate data points from the weighted combination of FACS poses.

Facial marker data points are constrained from moving uniquely by themselves, at block 220. The constraint is applicable because the likelihood of a single, particular facial marker data point moving in a significantly different manner than the neighboring facial marker data points is low, so unique behavior by a single facial marker data point typically indicates a defective data point. Once determined, the improper movement of the data point can be modified.

At block 230, the facial marker data points are constrained to moving together with a corresponding muscle group. In one implementation, facial marker data points are not permitted to move in ways that would be unnatural with respect to the muscle group to which the marker data points belong.

The facial marker data are fine-stabilized in the frames, at block 240. In one implementation, the spatial positions of the facial marker data points are fine-stabilized by adjusting facial marker data point movements to conform to a predetermined facial surface model. In another implementation, fine-stabilization is accomplished using the facial poses maintained in the FACS matrix to adjust outlying facial marker data points. In a further implementation, the facial marker data points are fine-stabilized manually using rigid markers.

In summary, the stabilization is handled in two ways—gross stabilization and fine stabilization. Gross stabilization makes use of rigid markers affixed on the body (e.g., head/face markers). These rigid markers are large enough that a transformation matrix can be computed to transform the position of the rigid markers (head/face) from their location in space to a canonical origin so that all analysis of facial expressions can be done in a lock down position. However in the presence of noise, inconsistent labels, and other anomalies (e.g., in facial expressions), the gross stabilization transform computed to lock down the head on a frame-by-frame basis is not consistent, which causes minor shakes, twists, pops, and other noises. When these data are used for facial re-targeting, generation of good facial expression is difficult. Consequently, there is a need for fine stabilization, which removes the shakes, twists, pops and other noises. This can be accomplished by making use of the FACS matrix for the particular actor. The FACS matrix is used to analyze minor movements in markers as being consistent with a given expression. Thus, for an expression, a group of markers indicates a consistent movement as learned from or as derived by a FACS matrix. However, if the movement is not as consistent or is inconsistent, the movement can be rectified and "compensated" on the whole face so as to get the whole face (and/or head) more stabilized.

Figure 3:
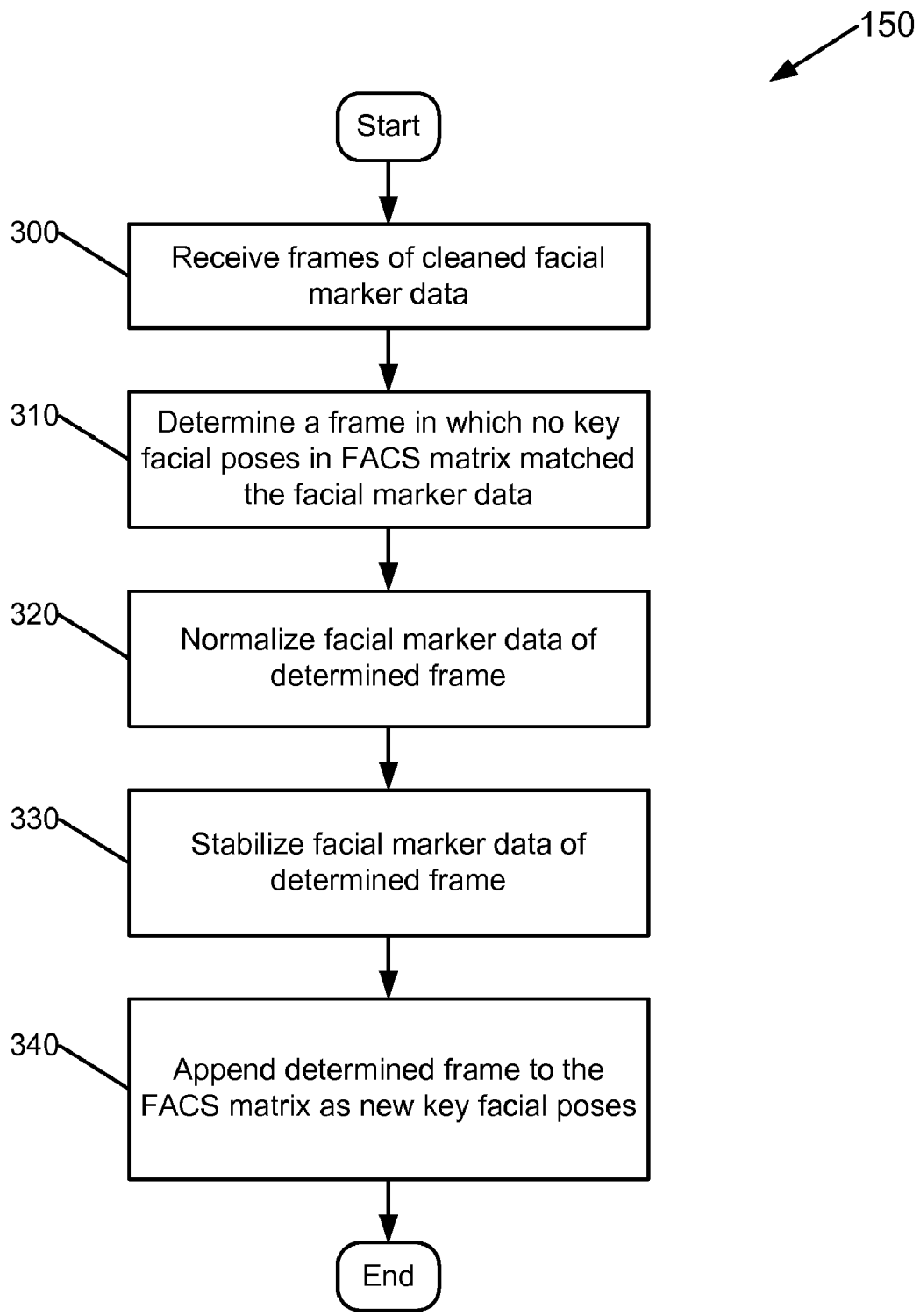
FIG. 3 is a flowchart of an example method of adding new key facial expressions to a facial expression matrix.

FIG. 3 is a flowchart of an example method 150 of adding new key facial poses to a FACS matrix. Frames of cleaned facial marker data are received, at block 300. In one implementation, the received frames are a sequence of frames comprising a beat. Alternatively, the received frames include any sequence of frames.

A frame is determined in which no key facial poses maintained by the FACS matrix closely match with the facial marker data, at block 310. In one implementation, an evaluation is made as to which frames in the beat capture poses (i.e., facial marker data representing a particular facial pose) that were successfully matched with key facial poses in the FACS matrix. Frames capturing poses that were not matched with key facial poses are also identified. Those frames with no matches exemplify insufficiencies in the population of facial poses maintained by the FACS matrix and thus provide the basic data for new key facial poses to add to the FACS matrix. The facial marker data that were not matched to key poses of the FACS matrix then become new data for addition to the FACS matrix (see block 340). Insufficiencies in the key facial poses maintained by the FACS matrix are thus remedied, resulting in a more complete and robust FACS matrix.

Facial marker data determined to have no matching key poses in the FACS matrix are normalized, at block 320, to eliminate scaling differences with other key facial pose data populating the FACS matrix, such as the survey facial marker data obtained during an initial FACS calibration. Size consistency is thus ensured over the population of key facial poses maintained in the FACS matrix, regardless of whether the key facial poses were obtained during the initial survey or during a performance. This facilitates matches with facial poses captured in subsequent incoming facial marker data.

The facial marker data to be added to the FACS matrix are stabilized, at block 330. In one implementation, the added facial marker data are stabilized to match the stabilization of the facial marker data of the key poses already captured in the FACS matrix. At block 340, the normalized and stabilized facial marker data are then added to the FACS matrix as a new key facial pose. In another implementation, a beat of facial marker data is re-analyzed using the FACS matrix including the newly added key facial poses. Poses in frames that were previously not matched are thus matched during this re-analysis, and the cleaned facial marker data are improved in quality over the previous analysis.

In one implementation, a plurality of frames having facial marker data to which no key facial poses maintained by the FACS matrix closely match are determined automatically. A list of the determined frames is provided from which frames are selected to be verified and appended as a group to the FACS matrix.

Figure 4:
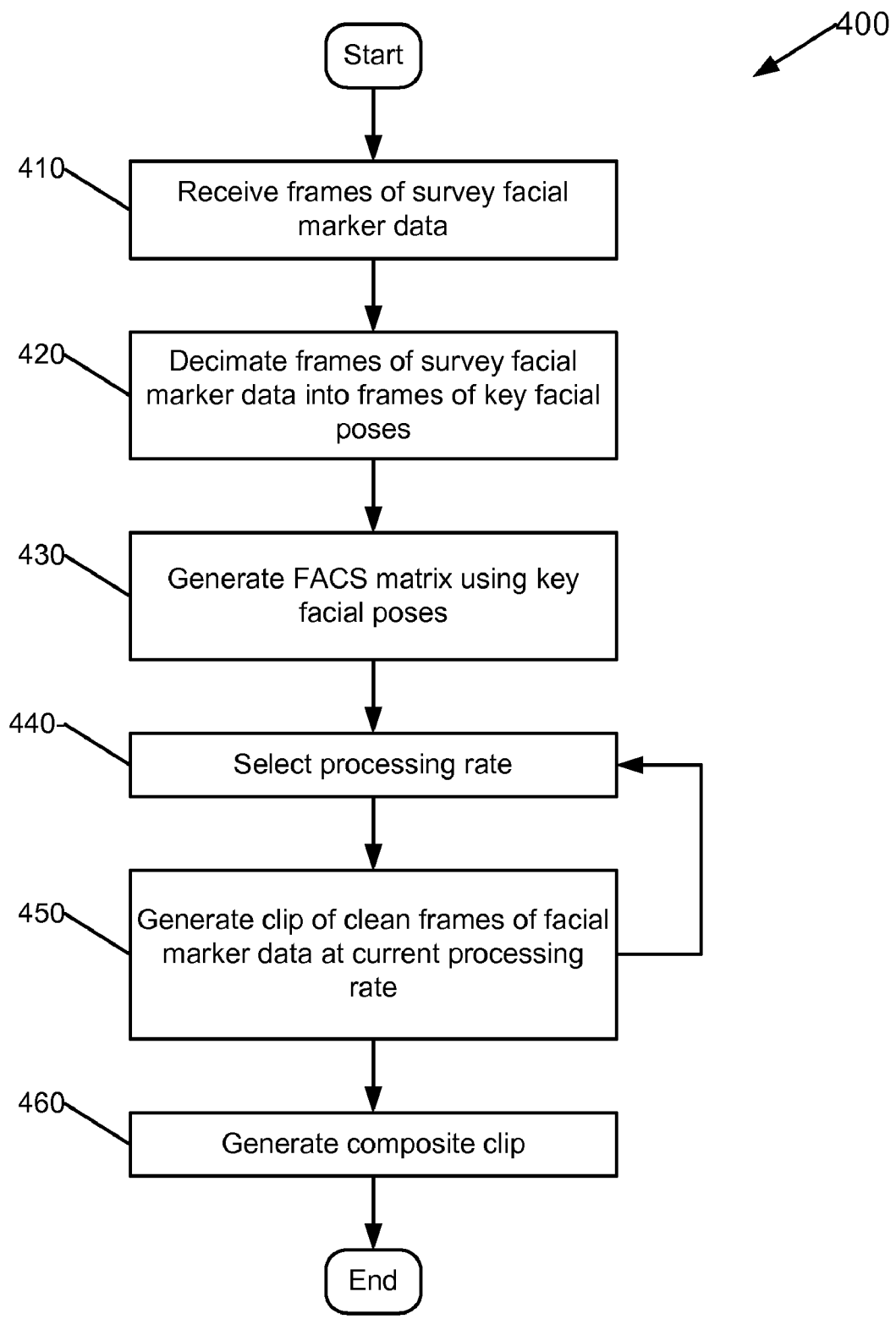
FIG. 4 is a flowchart of an example method of FACS cleaning using a variable rate.

FIG. 4 is a flowchart of an example method of FACS cleaning using a "3-D damping," which provides variable rate processing. In one implementation, cleaning includes adjustments for controlling noise and dampening facial marker data point movement, thus substantially eliminating jiggle. However, no single processing rate can compensate for the variable rates of change of facial movements captured within a beat. Variable rate processing in the form of "3-D damping" is therefore included, which generates a composite of cleaning results at the various rates.

In one implementation, a sequence of frames is cleaned at a plurality of different rates, e.g., fast, medium, and slow, using threshold and frequency ("3-D damping"). Thus, in "3-D damping", threshold and frequency of processing are adjusted to vary the time for reacting to the incoming data. For example, low numbers like 50-50 make data act rubbery in fast areas while making data look fine in slow areas. High numbers like 200-240 make data look fine in fast areas but degrades the ability to remove noise in slow moving noisy areas.

Each result is stored as a separate "clip" of the same beat, where each clip corresponds to a unique processing rate. Subset sequences of frames are then selected from the various clips, each subset best representing the actor's motion during the period of the performance captured therein. The subset sequences are then composited to generate a master clip, which is used to animate a facial model.

In one implementation, the master clip is characterized by reduced noise. For example, by compositing in the low range of rates, remaining noise or jitter in slow-moving areas is removed.

The example method 400 shown in FIG. 4 for cleaning using a variable rate processing is similar to the example method 100 illustrated in FIG. 1 for cleaning. Following a survey of facial expressions, as discussed above, frames of facial marker data are received, at block 410, and decimated into frames of key facial poses, at block 420. The key facial poses include, for example, various expressive components such as a lip raiser, eyebrow raiser, and cheek puffer.

A FACS matrix is generated, at block 430, to maintain some or all of the key facial poses extracted from the motion capture data (at block 420).

A processing rate is selected, at block 440, using the above-described "3-D damping". In one implementation, as discussed above, one of three rates corresponding to fast, medium, and slow rates is selected by selecting threshold and frequency numbers. It will be appreciated that these are relative numbers which can be described in a number of ways. In one implementation, any number of different threshold and frequency numbers are selectable according to production requirements.

Facial motion capture data are cleaned using the FACS matrix at the selected rate, at block 450. Typically, an entire beat of facial motion capture data is analyzed. Facial marker data points are analyzed and movements which are not allowable according to predefined rules are identified. In one implementation, only allowable facial marker data point movements are returned. Thus, cleaning provides filtering according to the selected rate (i.e., sampling rate) to remove noise artifacts in the facial marker data. Further, cleaning includes determining spatial positions which the marker data points should have occupied but were instead occluded during the actor's performance. Cleaning includes filling the resulting gaps in the facial marker data point trajectories with data points conforming to applicable rules. A clip at the selected rate is thus generated, where the clip includes a sequence of frames corresponding to the beat, with gapless, properly labeled, and noiseless data points.

Another rate is selected, at block 440, if desired. Facial motion capture data are again cleaned using the FACS matrix at the selected rate, and another clip corresponding to the selected rate is generated, at block 450. Further rates are selected, at block 440, followed by cleaning, and generation of a new clip, at block 450, until no further processing of the beat is required.

A composite "master" clip is generated, at block 460. In one implementation, the master clip includes portions of one or more of the clips generated at the processing rates. Each clip portion thus represents a desired facial motion capture result for a corresponding portion of the beat, and the master clip represents a desired facial motion capture result for the entire beat.

Figure 5:
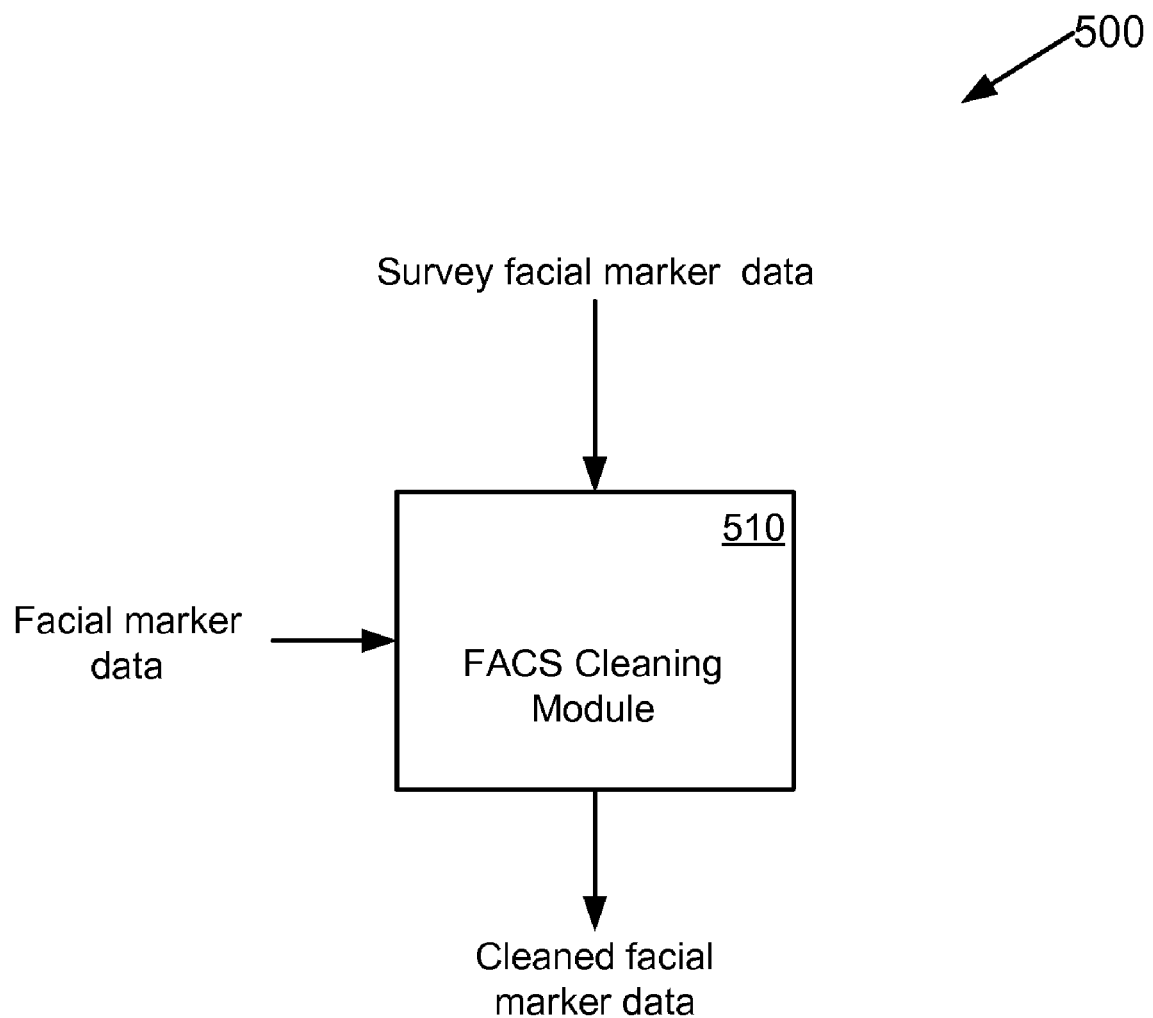
FIG. 5 is a functional block diagram of an example implementation of a FACS cleaning system.

FIG. 5 is a functional block diagram of an example implementation of a FACS cleaning system 500. A FACS cleaning module 510 receives survey facial marker data and incoming facial marker data, and generates cleaned facial marker data.

In one implementation, the incoming facial marker data comprise a sequence of frames representing a beat.

Figure 6:
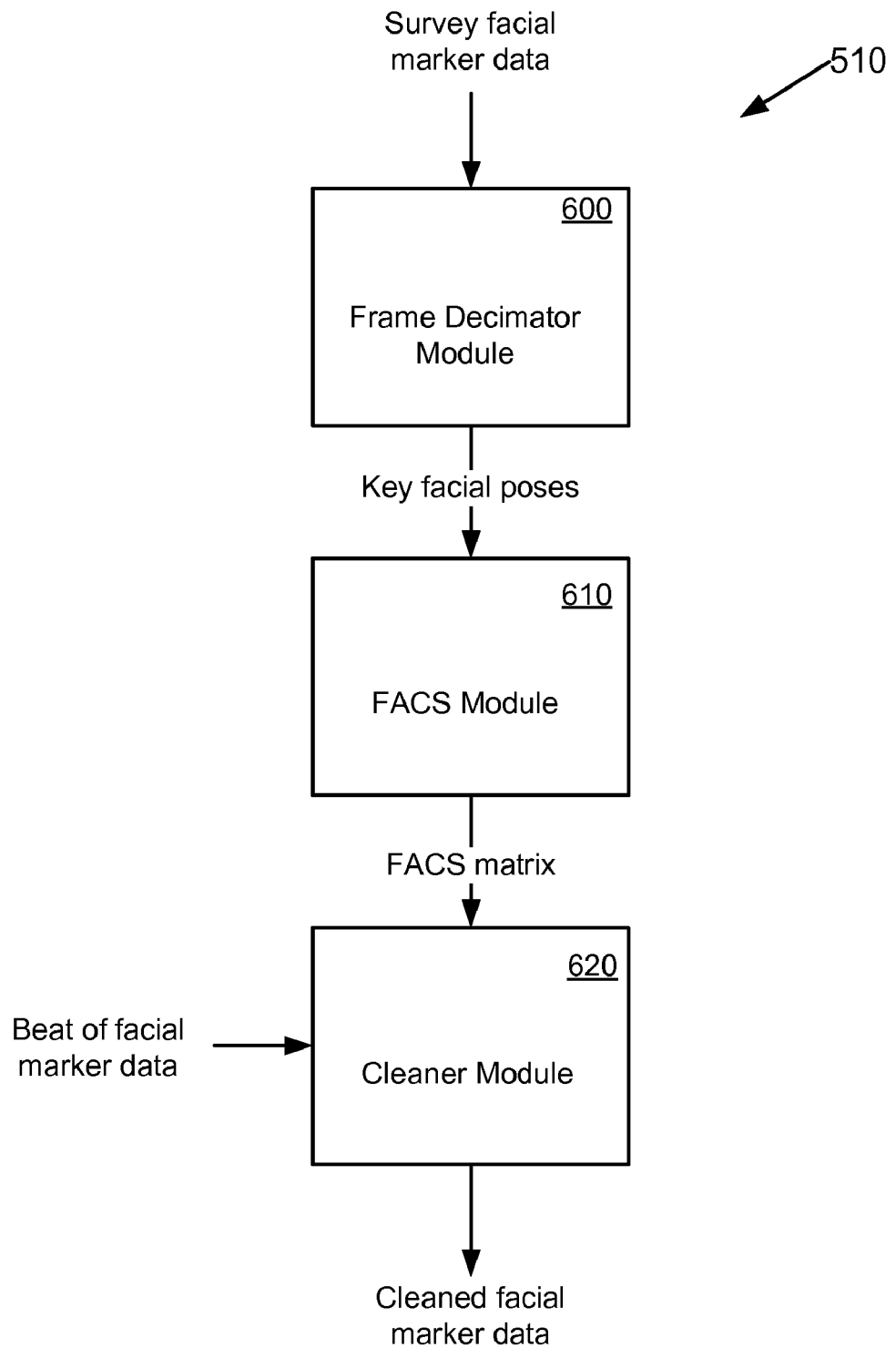
FIG. 6 is a functional block diagram of an example implementation of the FACS cleaning system.

FIG. 6 is a functional block diagram of a FACS cleaning system 510 in accordance with one implementation. The FACS cleaning system 510 includes a frame decimator module 600, a FACS module 610, and a cleaner module 620.

Following a survey of facial expressions, as discussed above, frames of survey facial marker data are received by the frame decimator module 600. The frames are decimated into frames of key facial poses, as discussed above in relation to FIG. 1, block 120. The key facial poses include, for example, various expressive components such as a lip raiser, eyebrow raiser, and cheek puffer.

A FACS matrix for the actor is maintained by the FACS module 610, which includes some or all of the key facial poses extracted from the motion capture data at the frame decimator module 600. As discussed above, the FACS matrix functions as a constraint space, defining rules for determining when a motion computed for a marker data point is an allowable motion. A FACS matrix is individually calibrated to an actor on the basis of a selection of specific example facial poses, and provides accurate, precise, and robust means for classifying the actor's facial expressions subsequently captured in performances. Key facial poses are received at the FACS module 610, and a FACS matrix is generated.

A beat of facial marker data capturing an actor's performance, and a FACS matrix corresponding to the actor, are received at the cleaner module 620. Cleaned facial marker data are generated using the FACS matrix. Facial marker data points are analyzed and movements which are not allowable according to predefined rules are identified. In one implementation, only allowable facial marker data point movements are returned. Cleaning thus provides a filtering effect to remove noise artifacts in the facial marker data. Further, cleaning includes determining spatial positions which the facial marker data points should have occupied but were instead occluded during the actor's performance. The resulting gaps in the facial marker data point trajectories are filled with data points conforming to applicable rules. Gapless, properly labeled, and noiseless data points are generated on output at the cleaner module 620.

In another implementation, the cleaner module 620 invokes a rule for constraining the facial marker data points to moving together with a corresponding muscle group. In yet another implementation, facial marker data points are not permitted to move in ways that would be unnatural with respect to the muscle group to which they belong.

In one implementation, the spatial positions of the facial marker data points are fine-stabilized at the cleaner module 620 by determining marker movements relative to a predetermined facial surface model. In another implementation, fine-stabilization is accomplished using the facial poses maintained in the FACS matrix to adjust outlying facial marker data points.

In one implementation, a sequence of frames is cleaned at the cleaner module 620 at a plurality of different rates, e.g., fast, medium, and slow. The results are stored as separate clips of the same beat, each clip corresponding to a unique processing rate. Subset sequences of frames are then selected from the various clips, each subset best representing the actor's motion during the period of the performance captured therein. The subset sequences are then composited to generate a master clip, which is used to animate a facial model.

In one implementation, the master clip is characterized by reduced noise. For example, by compositing in the low range of rates, remaining noise or jitter in slow-moving areas is removed.

Figure 7:
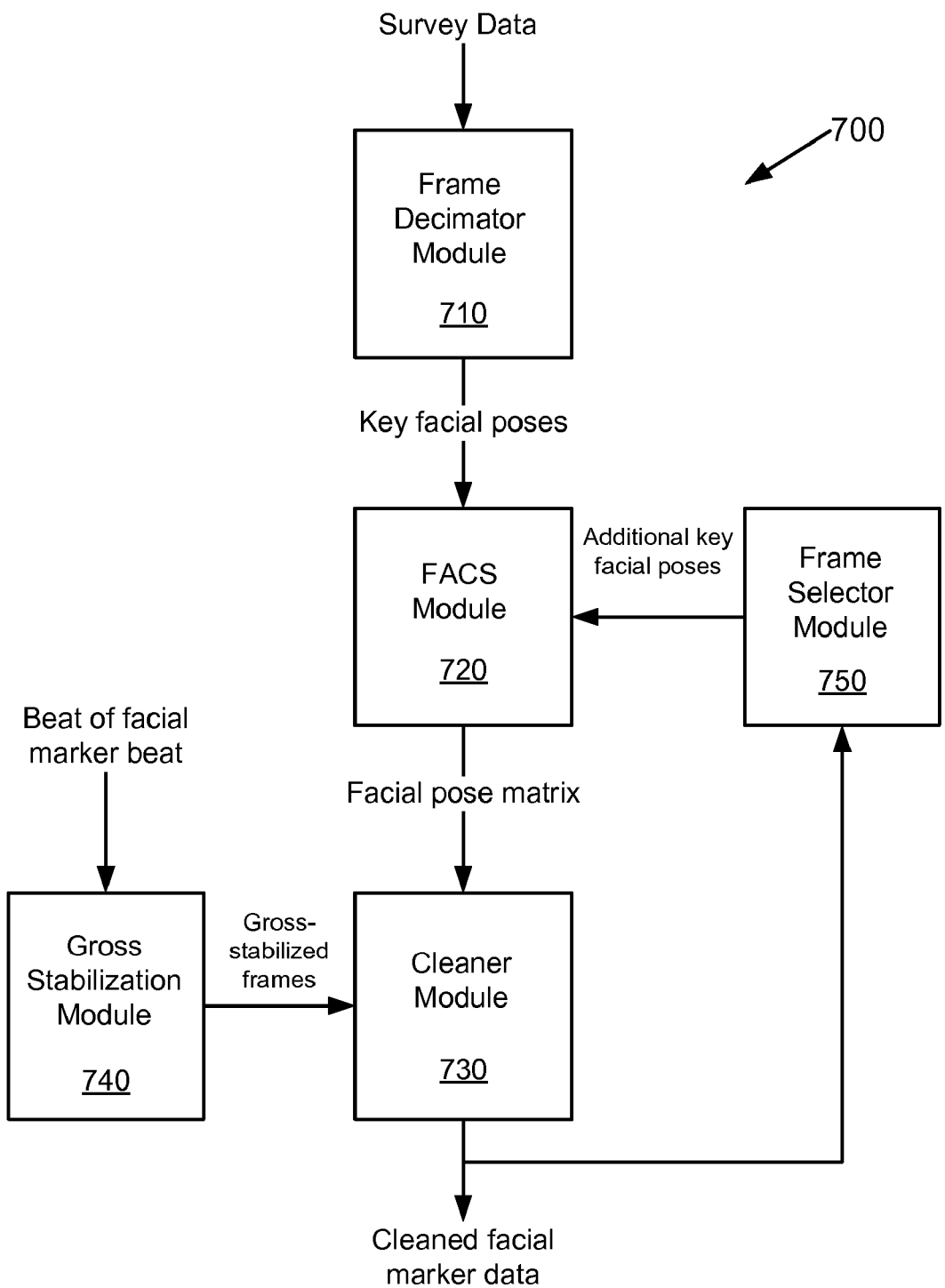
FIG. 7 is a functional block diagram of an example implementation of the FACS cleaning system using a variable rate.

FIG. 7 is a functional block diagram of a FACS cleaning system 700 in accordance with another implementation. In the illustrated implementation of FIG. 7, the FACS cleaning system 700 is operable to add key facial poses to a FACS matrix. The FACS cleaning system 700 includes a frame decimator module 710, a FACS module 720, a cleaner module 730, a gross stabilization module 740, and a frame selector module 750.

Following a survey of facial expressions, frames of survey facial marker data are received by the frame decimator module 710. The frames are decimated into frames of key facial poses, as discussed above in relation to FIG. 1, block 120. The key facial poses include, for example, various expressive components such as a lip raiser, eyebrow raiser, and cheek puffer.

A FACS matrix for the actor is maintained by the FACS module 720, which includes some or all of the key facial poses extracted from the survey facial marker data at the frame decimator module 710. As discussed above, the FACS matrix functions as a constraint space, defining rules for determining when a motion computed for a marker data point is an allowable motion. A FACS matrix is individually calibrated to an actor on the basis of a selection of specific example facial poses, providing accurate, precise, and robust means for classifying the actor's facial expressions captured subsequently in performances.

In addition to receiving key facial poses, the FACS module 720 also receives additional key facial poses generated at the frame selector module 750. The additional key facial poses are treated similarly to the key facial poses derived from survey data at the frame decimator module 710, and are added to the FACS matrix. The FACS matrix is generated on output.

Frames comprising a gross-stabilized beat of facial marker data capturing an actor's performance, and a FACS matrix corresponding to the actor, are received at the cleaner module 730. Cleaned facial marker data are generated using the FACS matrix. The functions of the cleaner module 730 are substantially similar to the functions of the cleaner module 620 discussed in relation to FIG. 6. That is, facial marker data points are analyzed and movements which are not allowable according to predefined rules are identified. Gapless, properly labeled, and noiseless facial marker data are generated on output at the cleaner module 730.

The facial marker data of a frame sequence are gross-stabilized at the gross stabilization module 740. During the course of a facial motion capture beat, an actor may execute large movements of the head, including translational and rotational movements, in addition to subtle motions related to facial expressions. In one implementation, the large movements of the head are eliminated, resulting in translation- and rotation-invariant facial marker data, and exposing the subtle movements of the actor's facial expressions. Remaining movements of the facial marker data are therefore related substantially only to facial expressions.

When a frame is determined in which no key facial poses maintained by the FACS matrix closely match with the facial marker data, the frame is selected as a candidate at the frame selector module 750 for addition to the FACS matrix maintained at the FACS module 720. In one implementation, frames are individually and manually selected at the frame selection module 750. In another implementation, frames are automatically selected. In yet another implementation, a list of selected frames is maintained at the frame selection module 750, from which all or a subset of selected frames listed are provided to the FACS module 720 for addition to the FACS matrix.

Figure 9A:
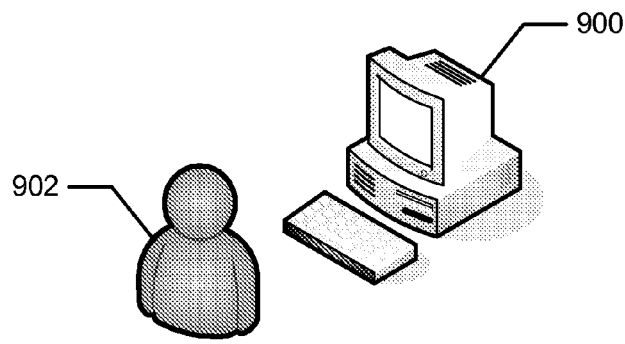
FIG. 9A is a diagram illustrating a user and computer system.

FIG. 9A illustrates a representation of a computer system 900 and a user 902. The user 902 can use the computer system 900 to perform FACS cleaning. The computer system 900 stores and executes a FACS cleaning system 990, which processes motion capture frame data.

Figure 9B:
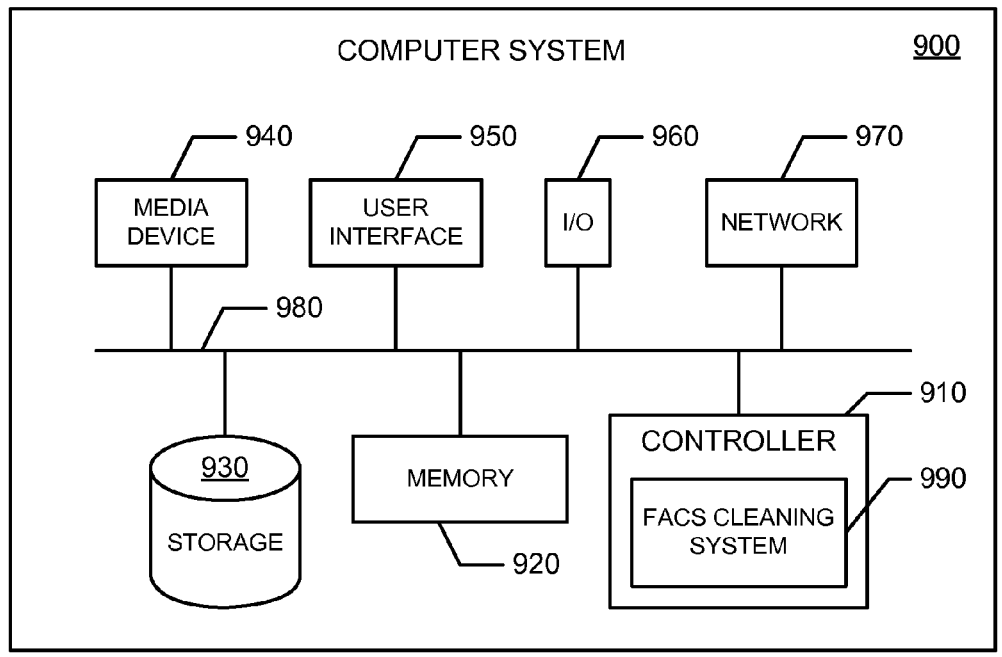
FIG. 9B is a functional block diagram of an example computer system hosting a FACS cleaning system.

FIG. 9B is a functional block diagram illustrating the computer system 900 hosting the FACS cleaning system 990. The controller 910 is a programmable processor and controls the operation of the computer system 900 and its components. The controller 910 loads instructions from the memory 920 or an embedded controller memory (not shown) and executes these instructions to control the system. In its execution, the controller 910 provides the FACS cleaning system 990 as a software system. Alternatively, this service can be implemented as separate components in the controller 910 or the computer system 900.

Memory 920 stores data temporarily for use by the other components of the computer system 900. In one implementation, memory 920 is implemented as RAM. In one implementation, memory 920 also includes long-term or permanent memory, such as flash memory and/or ROM.

Storage 930 stores data temporarily or long term for use by other components of the computer system 900, such as for storing data used by the FACS cleaning system 990. In one implementation, storage 930 is a hard disk drive.

The media device 940 receives removable media and reads and/or writes data to the inserted media. In one implementation, for example, the media device 940 is an optical disc drive.

The user interface 950 includes components for accepting user input from the user of the computer system 900 and presenting information to the user. In one implementation, the user interface 950 includes a keyboard, a mouse, audio speakers, and a display. The controller 910 uses input from the user to adjust the operation of the computer system 900.

The I/O interface 960 includes one or more I/O ports to connect to corresponding I/O devices, such as external storage or supplemental devices (e.g., a printer or a PDA). In one implementation, the ports of the I/O interface 960 include ports such as: USB ports, PCMCIA ports, serial ports, and/or parallel ports. In another implementation, the I/O interface 960 includes a wireless interface for communication with external devices wirelessly.

The network interface 970 includes a wired and/or wireless network connection, such as an RJ-45 or "Wi-Fi" interface (including, but not limited to 802.11) supporting an Ethernet connection.

The computer system 900 includes additional hardware and software typical of computer systems (e.g., power, cooling, operating system), though these components are not specifically shown in FIG. 9B for simplicity. In other implementations, different configurations of the computer system can be used (e.g., different bus or storage configurations or a multi-processor configuration).

Various illustrative implementations of the present invention have been described. However, one of ordinary skill in the art will recognize that additional implementations are also possible and within the scope of the present invention. For example, although the FACS cleaning system has been described generally in terms of facial marker data, the system can be applied to other types of motion capture marker data, such as body marker data. In this example, a generated body FACS matrix can be decimated out of a range of motion (ROM). In one implementation, a "T-pose" is performed by an actor at the beginning and end of a beat to provide standard positions between which markers are tracked. In another implementation, cleaning includes artificially generating a T-pose using marker data from all of the frames comprising a beat. By generating a T-pose artificially, a problem is addressed in which an actor fails to perform a true neutral T-pose, causing offsets in the resulting animation. A capability is provided also to identify a true T-pose already present in the input beat and specify the frame in which it exists. If a true T-pose is not identified, it can then be generated artificially.

Further, it will be appreciated that grouping functionalities within a module or block is for ease of description. Specific functionalities can be moved from one module or block to another without departing from the invention.

Accordingly, the present invention is not limited to only those embodiments described above.

What is claimed is:

1. A computer-implemented method of cleaning facial marker data, the method comprising:

decimating frames of survey facial marker data into representative frames of key facial poses;

generating a facial pose matrix that defines rules for determining when a motion computed for a facial marker data point is within acceptable limits using the representative frames of key facial poses; and cleaning incoming frames of facial marker data including analyzing facial marker data points, identifying movements which are not allowable according to predefined rules, using the facial pose matrix, and asserting a cleaning rule, wherein the cleaning rule includes constraining all facial marker data points corresponding to a muscle group to moving together;

wherein the facial pose matrix is generated by at least one module residing in a processor.

2. The method of claim 1, wherein the cleaning rule includes constraining a facial marker data point from moving uniquely by itself.

3. The method of claim 1, wherein said cleaning incoming frames of facial marker data includes stabilizing the facial marker data.

4. The method of claim 1, wherein said cleaning incoming frames of facial marker data includes removing noise artifacts in the facial marker data:

5. The method of claim 1, further comprising adding new representative frames of key facial poses to the facial pose matrix.

6. The method of claim 1, wherein said cleaning incoming frames of facial marker data is performed using a plurality of rates.

7. The method of claim 1, wherein said key facial poses include expressive facial expressions that determine the range of acceptable limits for facial poses.

8. A computer-implemented method of cleaning facial marker data, the method comprising:

decimating frames of survey facial marker data into representative frames of key facial poses;

generating a facial pose matrix that defines rules for determining when a motion computed for a facial marker data point is within acceptable limits using the representative frames of key facial poses;

cleaning incoming frames of facial marker data including analyzing facial marker data points, and identifying movements which are not allowable according to predefined rules, using the facial pose matrix;

wherein the facial pose matrix is generated by at least one module residing in a processor;

adding new representative frames of key facial poses to the facial pose matrix, wherein said adding new representative frames of key facial poses to the facial pose matrix includes:
determining a selected frame of said incoming frames wherein key facial poses in the facial pose matrix fail to match with spatial positions of facial marker data of the selected frame;
normalizing the facial marker data of the selected frame, including eliminating scaling differences between the facial marker data of the selected frame and key facial poses in the facial pose matrix;
stabilizing the facial marker data of the selected frame; and
appending the selected frame to the facial pose matrix as a new key facial pose.

9. The method of claim 8, wherein said determining a frame in which key facial poses in the facial pose matrix failed to match with spatial positions of the original facial marker data is performed automatically.

10. The method of claim 9, further comprising
automatically generating a list including the determined frame.

11. The method of claim 8, wherein said stabilizing establishes a level of data stabilization present in the facial pose matrix.

12. A facial marker data cleaning system, the system comprising:
a processor comprising:
a frame decimator module to receive frames of survey facial marker data and to generate frames of representative key facial poses;
a FACS module to receive the representative frames of key facial poses and to generate a facial pose matrix that defines rules for determining when a motion computed for a facial marker data point is within acceptable limits; and
a cleaner module to receive incoming frames of facial marker data and to use the facial pose matrix to generate frames of cleaned facial marker data by analyzing facial marker data points and identifying movements which are not allowable according to predefined rules; and
a memory in communication with the processor, wherein the processor loads instructions from the memory and executes the instructions to control the system,
wherein said cleaner module operates to constrain all markers of a muscle group to move together.

13. The system of claim 12, wherein said cleaner module operates to constrain a facial marker data point from moving uniquely by itself.

14. The system of claim 12, further comprising
a gross stabilization module to receive a beat of facial marker data and to generate frames of gross-stabilized facial marker data.

15. The system of claim 14, wherein said cleaner module operates to fine-stabilize the frames of gross-stabilized facial marker data.

16. The system of claim 12, further comprising
a frame selector module to receive the frames of cleaned facial marker data and to generate selected frames including additional key facial poses.

17. The system of claim 16, wherein said frame selector module automatically selects frames including the additional key facial poses, and generates a list of the selected frames.

18. The system of claim 16, wherein said FACS module receives the selected frames including the additional key facial poses and adds the additional key facial poses to a FACS matrix.

19. The system of claim 12, wherein said cleaner module further generates a plurality of clips of a sequence of cleaned frames, each clip having a different processing rate.

20. The system of claim 19, wherein selected clips of the plurality of clips are composited to generate a master clip.

21. An apparatus for cleaning facial marker data, the apparatus comprising:
means for decimating frames of survey facial marker data into representative frames of key facial poses;
means for generating a facial pose matrix that defines rules for determining when a motion computed for a facial marker data point is within acceptable limits using the representative frames of key facial poses; and
means for cleaning incoming frames of facial marker data including analyzing facial marker data points, identifying movements which are not allowable according to predefined rules, using the facial pose matrix, and asserting a cleaning rule,
wherein the cleaning rule includes constraining all facial marker data points corresponding to a muscle group to moving together.

22. A non-transitory tangible storage medium storing a computer program for cleaning facial marker data, the computer program comprising executable instructions that cause a computer to:
decimate frames of survey facial marker data into representative frames of key facial poses;
generate a facial pose matrix that defines rules for determining when a motion computed for a facial marker data point is within acceptable limits using the representative frames of key facial poses; and
clean incoming frames of facial marker data including analyze facial marker data points, identify movements which are not allowable according to predefined rules, using the facial pose matrix, and assert a cleaning rule,
wherein the cleaning rule includes constraining all facial marker data points corresponding to a muscle group to moving together.

* * * * *